Patented Jan. 18, 1944

2,339,672

UNITED STATES PATENT OFFICE 2,339,672

MANUFACTURE OF ESTERS OF MONONITRILES OF DICARBOXYLIC ACIDS

Burnard S. Biggs, Summit, N. J., assignor to Bell Telephone Laboratories, Incorporated, New York, N. Y., a corporation of New York No Drawing. Application November 22, 1940, Serial No. 366,722

12 Claims. (Cl. 260—464)

This invention relates to the art of preparing esters of cyano organic acids or, in other words, esters of mononitriles of dicarboxylic acids.

One of the objects of the present invention is to provide a process for the production of such a substance which is simple, non-critical in nature, economical, and productive of large yields. This and other objects of the invention will be explained in the following discussion.

According to the present invention the mononitrile of the dicarboxylic acid is prepared according to a convenient process according to which a mixture of products is obtained. This mixture comprises the mononitrile and dinitrile of the acid and the dicarboxylic acid itself. The entire mixture is heated with a suitable alcohol to form the desired ester of the mononitrile, as well as other esters, and the desired ester is readily separated therefrom, as by fractional distillation. Thus is avoided the necessity of isolating the mononitrile, which is separable only with difficulty from the dinitrile and dicarboxylic acid with which it tends to exist in equilibrium.

The present invention provides a preferred process according to which an amide, such as a diamide, of a dicarboxylic acid, or an ammonium salt, such as a diammonium salt, of a dicarboxylic acid is subjected to pyrolysis under such conditions that a large proportion of the mononitrile of the acid is formed, along with other reaction products. Without separation of the mononitrile from the mass of mixed reaction products and unchanged reactants, the entire mass is heated with an alcohol of the type which will produce the desired ester, an esterification catalyst being employed if desired. The desired ester may be then separated from the remaining products by fractional distillation.

According to another preferred aspect of the present invention a dicarboxylic acid and an ammonia-providing substance are reacted under such conditions that the amide or ammonium salt of the acid which is formed is pyrolized to form a large proportion of mononitrile of the acid. Said mononitrile is not isolated from the other reaction products or unchanged reactants, but the entire mass of reaction products and unchanged reactants is reacted with a suitable alcohol to form the desired ester of the mononitrile of the dicarboxylic acid, which may be removed from the mixture of substances by fractional distillation.

Various types of esters, such as the alkyl, aryl and aralkyl esters of various kinds of cyano acids, such as alkyl, aryl and aralkyl cyano acids may be readily produced according to the present invention. Such esters may have the cyano and carboxylic groups at the ends of the molecules or intermediate the ends thereof. It is undesirable to employ the process of the present invention for the production of esters of cyano acids having their cyano and carboxyl groups separated by less than five atoms, preferably carbon atoms. Undesirable cyclic compounds often are formed if it is attempted to produce mononitriles (from which the esters are later formed) having a lesser number of atoms between the cyano and carboxylic groups, with an attendant considerable reduction in the yield of the mononitrile. Furthermore it is preferable that monohydroxy alcohols only be employed in the production of esters according to the present invention, since the employment of polyhydroxy alcohols may result in the formation of undesirable cyclic compounds which may seriously diminish the yield of the desired mononitrile esters.

While the present invention may be employed for the production of a wide variety of esters of various acids and alcohols, it lends itself particularly well to the production of lower alkyl esters of aliphatic cyano acids in which the cyano and carboxylic groups are at the opposite ends of the aliphatic chain.

In the case where the procedure is employed in which an ammonium salt or amide of dicarboxylic acid is pyrolized, the substance is heated either in air, under pressure, or in a vacuum as desired, the temperature to which it is heated ranging from 150° C. to 350° C., depending to a large extent upon the pressure employed. The time required for completion of the reaction will depend upon such factors as the temperature and pressure employed, the quantity of salt or amide which is heated, etc., but usually several hours are required. Preferably none of the derivatives of the acid resulting from the reaction is removed during the heating operation. Indeed it is preferable that the heating be halted before the reaction products other than water and ammonia tend to escape in the form of vapors. Substantially no excess ammonia is present other than the ammonia which may be formed as a result of the pyrolysis, since the presence of substantial quantities of ammonia will result in the reduction on the yield of a mononitrile and a corresponding decrease in the production of the ester thereof.

Besides the mononitrile, the dinitrile of the dicarboxylic acid and the dicarboxylic acid itself are produced as reaction products, all such products being mixed together. The mass of mixed reaction products and unchanged reactants, if any, without isolation of the mononitrile therefrom, may be dissolved in a suitable monohydroxy alcohol which will form the desired ester, a small amount of a suitable catalyst, such as sulphuric acid or p-toluene sulphonic acid, being added if desired. The whole mass is heated for several hours. Thereafter it may be washed and treated with a suitable salt solution to neutralize free acids which may be present. At this stage the mass essentially comprises the dinitrile of the dicarboxylic acid, the diester of the acid, and the desired ester of the mononitrile of the acid, all of which are distillable and may be separated by fractional distillation.

In the procedure wherein a dicarboxylic acid and an ammonia-producing substance are reacted to form a product which is decomposed to the mononitrile, the dicarboxylic acid for the reasons indicated above preferably has at least five carbon atoms between its carboxyl groups. It is heated with a substance which provides ammonia when heated, such as urea, thiourea, ammonium cyanate, ammonium thiocyanate, ammonium carbonate or ammonium carbamate. Preferably the ammonia-providing substance has two reactive groups capable of providing ammonia, since a more efficient reaction involving a smaller amount of the ammonia-providing substance results than if a substance having only one ammonia providing group is employed. The heating is conducted at a temperature sufficient to form the diamide and decompose it to the mononitrile. Under suitable circumstances it is probable that some diammonium salt is first formed which is then converted into the dinitrile after which decomposition of the dinitrile will occur as indicated. The reactants may be heated for several hours in air, under pressure, or under a vacuum to a suitable temperature, generally lying between about 150° C. and 350° C. Besides the mononitrile, the mixture of end products includes the dinitrile of the dicarboxylic acid and the acid itself. None of these reaction products is removed during the reaction and the heating is preferably halted before reaction products other than water and ammonia tend to escape from the reaction mass in the form of vapors.

No substantial excess of ammonia is added or is present. Indeed the amount of ammonia-providing substance which is employed should not be much, if any, greater than that calculated to convert the dicarboxylic acid to the diamide. If an excess is employed, it preferably should not be greater than about 25 per cent more than the weight calculated to form the diamide. Otherwise a large excess of ammonia produced will cause the formation of a larger proportion of the dinitrile at the expense of the yield of the desired mononitrile. On the other hand the amount of ammonia-providing substance employed should not be substantially less than that calculated to produce the dinitrile since under such circumstances the proportion of the dicarboxylic acid produced as a result of the reaction is increased at the expense of the yield of the mononitrile.

As indicated above, the mass of mixed reaction products and unchanged reactants, if any, is, without any attempt to isolate the mononitrile, caused to react with a monohydroxy alcohol of the type which will produce the desired ester, after which the desired ester may be separated from the other reaction products by a suitable method such as fractional distillation.

The mononitrile, in a mixture with the dinitrile and the dicarboxylic acid, may also be prepared by heating together the dicarboxylic acid and the dinitrile of said acid. For the reasons indicated above, it is preferable that said acid be one in which the carboxyl groups are separated by at least five atoms. Under such conditions these substances react to form a mixture of the mononitrile and dinitrile of the dicarboxylic acid and the acid itself. The amount of mononitrile produced is dependent upon the proportions of the acid and the dinitrile originally present.

The acid and the dinitrile may be heated in air, at atmosphere or elevated pressures, or in a vacuum. It may be heated to a temperature of from about 150° C. to about 350° C., depending largely upon the pressures employed. Several hours of heating are usually required.

As indicated above, the mixture may be dissolved in a suitable monohydroxy alcohol, a small amount of a suitable catalyst being added if desired, the whole mass being heated until substantial esterification occurs. The desired ester of the mononitrile may be isolated, as indicated above, by fractional distillation.

The following examples are given for the purpose of illustration and are not to be considered as limitative, since various modifications may be made therein without departing from the spirit of the invention.

*Example I*

According to this example the mononitrile of sebacic acid, 9-cyano-nonanoate, was produced with other products by destructive distillation of the diamide of sebacic acid. The diamide was placed in a suitable flask and heated slowly until it had all melted and then was heated as rapidly as the foaming thereof would permit. Steam and ammonia began to escape almost at once and the temperature of the vapor rose rapidly until an oily vapor commenced to distill at about 305° C., after which the heating was halted. The mixed mass at this point comprised a large proportion of the mononitrile of sebacic acid, the dinitrile of sebacic acid and sebacic acid itself.

This mass was then dissolved in an excess of methyl alcohol, a small amount of sulphuric acid being added as a catalyst. The solution was heated and refluxed for about thirty-six hours, at the end of which time little, if any, more of the desired ester formed. After cooling, the mixture of reaction products and unchanged reactants was washed with water and then with sodium carbonate solution, which formed soluble salts of free acids. An oily and readily separable layer formed comprising the dinitrile of sebacic acid, dimethyl sebacate, and the desired methyl ester of the mononitrile of sebacic acid. All of these substances were distillable and, therefore, were separated by fractional distillation. At a pressure of 60 millimeters of mercury, the boiling points of the dinitrile of sebacic acid, the methyl ester of the mononitrile, and dimethyl sebacate are respectively approximately 204° C., 178° C. and 161° C. While the boiling points of the last two named substances are quite close, sufficient separation of the substances was achieved by fractional distillation to satisfy all practical purposes. The degree of separation was easily determined by means of the refractive indices of the substances, which are 1.445, 1.4398, 1.4360, respectively, at 25° C. The dinitrile and dimethyl sebacate fractions were recycled in subsequent runs so that the only product isolated was the methyl ester of the mononitrile of sebacic acid, or 9-cyano-methyl-nonanoate.

Example II

A mixture of 890 grams of sebacic acid and 324 grams of urea (approximately 125 per cent of the weight of the urea necessary to convert the acid into the diamide) was heated to about 160° C. Considerable foaming took place at first and the flask containing the reactants was heated only as fast as the foaming would allow. Water, ammonia, carbon dioxide and some by-products of the urea passed out of the flask at first, after which oily vapors commenced to form. Heating was then halted, the total heating time being in the neighborhood of four hours. The mass in the flask at this point comprised a mixture of the dinitrile of sebacic acid, a large proportion of the mononitrile of sebacic acid, and sebacic acid itself. The mixture was then dissolved in an excess of methyl alcohol with a small amount of sulphuric acid added as a catalyst, and was heated and refluxed for about thirty-six hours. The mixture of reaction products, including the dinitrile of sebacic acid, dimethyl sebacate, and the methyl ester of the mononitrile of sebacic acid, and unchanged reactants was then washed with water and sodium carbonate. The oily layer containing the desired methyl ester was separated and fractionally distilled as indicated above.

The 9-cyano-methyl-nonanoate which may be thus produced according to the present invention forms no part of the present invention, but is described and claimed in Patent No. 2,277,033, issued March 24, 1942 to W. S. Bishop.

According to the present invention it is possible to obtain yields of the desired ester of the mononitrile of a dicarboxylic acid of as great as 40 to 50 per cent of yields calculated upon the dicarboxylic acid or the salt or the amide thereof, depending upon whichever is used.

The present invention thus provides a simple, non-critical method of producing esters of cyano acids in large yields with the employment of inexpensive, readily obtainable reactants which do not present any unsual difficulties in handling. While esters of the type which may be produced according to the present invention may be employed for various purposes, they may be advantageously employed in the production of hydrocarbon alcohol-amines according to a process wherein they are hydrogenated with the reduction of the cyano and ester groups to amino and hydroxyl groups, as described in copending application Serial No. 366,716, filed November 22, 1940, by W. S. Bishop.

It is apparent that various modifications may be made in the methods indicated above and that other methods may be employed differing in various respects with those indicated above which do not depart in spirit from the present invention.

It is intended that the patent shall cover by suitable expression in the appended claims whatever features of patentable novelty reside in the invention.

What is claimed is:

1. The process of producing an ester of a mononitrile of a dicarboxylic acid comprising heating as the sole active ingredient a diamide of a dicarboxylic acid until said diamide decomposes into a mixture of reaction products including a substantial portion of the mononitrile of said dicarboxylic acid, heating said mixture of reaction products under esterifying conditions with a monohydroxy alcohol for a time sufficient to effect substantial esterification of the carboxyl groups in said mixture of reaction products, and separating the resulting ester of the mononitrile of said dicarboxylic acid from the resulting esterified mixture of reaction products by a fractional distillation process involving heating said esterified mixture of reaction products.

2. The process of producing an ester of a mononitrile of a dicarboxylic acid comprising heating as the sole active ingredient a diamide of a dicarboxylic acid having its carboxyl groups separated by at least five atoms at a temperature between about 150° C. and about 350° C. until said diamide decomposes into a mixture of reaction products including a substantial proportion of the mononitrile of said dicarboxylic acid, heating said mixture of reaction products under esterifying conditions with a monohydroxy alcohol for a time sufficient to effect substantial esterification of the carboxyl groups in said mixture of reaction products, and separating the resulting ester of the mononitrile of said dicarboxylic acid from the resulting esterified mixture of reaction products by a fractional distillation process involving heating said esterified mixture of reaction products.

3. The process of producing an ester of a mononitrile of an aliphatic dicarboxylic acid comprising heating as the sole active ingredient a diamide of an aliphatic dicarboxylic acid having its carboxyl groups separated by at least five atoms at a temperature between about 150° C. and about 350° C. until said diamide decomposes into a mixture of reaction products including a substantial portion of the mononitrile of said dicarboxylic acid, heating said mixture of reaction products under esterifying conditions with a monohydroxy alcohol for a time sufficient to effect substantial esterification of the carboxyl groups in said mixture of reaction products, and separating the resulting ester of the mononitrile of said dicarboxylic acid from the resulting esterified mixture of reaction products by a fractional distillation process involving heating said esterified mixture of reaction products.

4. The process of producing an ester of a mononitrile of a dicarboxylic acid comprising heating alone a diamide of a dicarboxylic acid having its carboxyl groups separated by at least five atoms at a temperature between about 150° C. and about 350° C. until said diamide decomposes into a mixture of reaction products including a substantial proportion of the mononitrile of said dicarboxylic acid, heating said mixture of reaction products under esterifying conditions with a monohydroxy alcohol for a time sufficient to effect substantial esterification of the carboxyl groups in said mixture of reaction products, and separating the resulting ester of the mononitrile of said dicarboxylic acid from the resulting esterified mixture of reaction products by a fractional distillation process involving heating said esterified mixture of reaction products.

5. The process of producing an ester of a mononitrile of a dicarboxylic acid comprising heating as the sole active ingredient a diammonium salt of a dicarboxylic acid at a temperature between about 150° C. and about 350° C. until said diamide decomposes into a mixture of reaction products including a substantial proportion of the mononitrile of said dicarboxylic acid, heating said mixture of reaction products under esterifying conditions with a monohydroxy alcohol for a time sufficient to effect substantial esterification of the carboxyl groups in said mixture of reaction products, and separating the resulting ester of the mononitrile of said dicarboxylic acid from the resulting esterified mixture of reaction products by a fractional distillation process involving heating said esterified mixture of reaction products.

6. The process of producing an ester of a mononitrile of a dicarboxylic acid comprising heating alone a diammonium salt of a dicarboxylic acid having its carboxyl groups separated by at least five atoms at a temperature between about 150° C. and about 350° C. until said diammonium salt decomposes into a mixture of reaction products including a substantial proportion of the mononitrile of said dicarboxylic acid, heating the mixture of said reaction products under esterifying conditions with a monohydroxy alcohol for a time sufficient to effect substantial esterification of the carboxyl groups in said mixture of reaction products, and separating the resulting ester of the mononitrile of said dicarboxylic acid from the resulting esterified mixture of reaction products by a fractional distillation process involving heating said esterified mixture of reaction products.

7. The process of producing an ester of a mononitrile of a dicarboxylic acid comprising heating as the sole active ingredient a diammonium salt of an aliphatic dicarboxylic acid having its carboxyl groups separated by at least five atoms to a temperature between about 150° C. and about 350° C. until said diammonium salt decomposes into a mixture of reaction products including a substantial proportion of the mononitrile of said dicarboxylic acid, heating said mixture of reaction products under esterifying conditions with a monohydroxy alcohol for a time sufficient to effect substantial esterification of the carboxyl groups in said mixture of reaction products, and separating the resulting ester of the mononitrile of said dicarboxylic acid from the resulting esterified mixture of reaction products by a fractional distillation process involving heating said esterified mixture of reaction products.

8. The process of producing an ester of a mononitrile of a dicarboxylic acid comprising heating as the sole active ingredients a mixture of a dicarboxylic acid and an ammonia-providing substance present in an amount substantially that theoretically required to convert said dicarboxylic acid into the diamide, said heating being performed at a temperature between about 150° C. and about 350° C. until a mixture of reaction products including a substantial proportion of the mononitrile of said dicarboxylic acid is formed, heating said mixture of reaction products under esterifying conditions with a monohydroxy alcohol for a time sufficient to effect substantial esterification of the carboxyl groups in said mixture of reaction products, and separating the resulting ester of the mononitrile of said dicarboxylic acid from the resulting esterfied mixture of reaction products by a fractional distillation process involving heating said esterified mixture of reaction products.

9. The process of producing an ester of a mononitrile of a dicarboxylic acid comprising heating alone a mixture of a dicarboxylic acid having its carboxyl groups separated by at least five atoms and an ammonia-providing substance present in an amount substantially that theoretically required to convert said dicarboxylic acid into the diamide, said heating being performed at a temperature between about 150° C. and about 350° C. until a mixture of reaction products including a substantial proportion of the mononitrile of said dicarboxylic acid is formed, heating said mixture of reaction products under esterifying conditions with a monohydroxy alcohol for a time sufficient to effect substantial esterification of the carboxyl groups in said mixture of reaction products, and separating the resulting ester of the mononitrile of said dicarboxylic acid from the resulting esterified mixture of reaction products by a fractional distillation process involving heating said esterified mixture of reaction products.

10. The process of producing an ester of a mononitrile of a dicarboxylic acid comprising heating as the sole active ingredients a mixture of an aliphatic dicarboxylic acid having its carboxyl groups separated by at least five atoms and an ammonia-providing substance which is present in an amount substantially that theoretically required to convert said dicarboxylic acid into the diamide, said heating being performed at a temperature between about 150° C. and about 350° C. until a mixture of reaction products including a substantial proportion of the mononitrile of said dicarboxylic acid is formed, heating said mixture of reaction products under esterifying conditions with a monohydroxy alcohol for a time sufficient to effect substantial esterification of the carboxyl group in said mixture of reaction products, and separating the resulting ester of the mononitrile of said dicarboxylic acid from the resulting esterified mixture of reaction products by a fractional distillation process involving heating said esterified mixture of reaction products.

11. The process of producing 9-cyano-methyl-nonanoate comprising heating alone the diamide of sebacic acid at a temperature between about 150° C. and about 350° C. until said diamide decomposes into a mixture of reaction products including a substantial proportion of 9-cyano-nonanoic acid, heating said mixture of reaction products under esterifying conditions with methyl alcohol for a time sufficient to effect substantial esterification of the carboxyl groups in said mixture of reaction products, and separating the resulting 9-cyano-methyl-nonanoate from the resulting esterified mixture of reaction products by a fractional distillation process involving heating said esterified mixture of reaction products.

12. The process of producing an ester of a mononitrile of a dicarboxylic acid having its carboxyl group separated by at least five carbon atoms, comprising forming at a temperature between about 150° C. and about 350° C. as the sole active ingredients an equilibrium mixture of the mononitrile of said dicarboxylic acid, the dinitrile of said dicarboxylic acid, and said dicarboxylic acid itself, said mixture containing a substantial proportion of said mononitrile, and heating said mixture under esterifying conditions with a monohydroxy alcohol for a time sufficient to effect substantial esterification of the carboxyl groups in said mixture, and separating the resulting ester of the mononitrile of said dicarboxylic acid from the resulting dinitrile and diester of said dicarboxylic acid by a fractional distillation process involving heating said esterified mixture.

BURNARD S. BIGGS.